United States Patent [19]
de Oliveira et al.

[11] Patent Number: 5,454,030
[45] Date of Patent: Sep. 26, 1995

[54] NETWORK OF VOICE AND/OR FAX MAIL SYSTEMS

[75] Inventors: Jorge A. F. de Oliveira, Cascais; Joao L. R. Costa, Queluz; Luis M. F. de Filipe, Oeiras, all of Portugal; Ralf M. Vogel, Chevy Chase, Md.; Robert J. Bomberowitz, Newton, Mass.

[73] Assignee: Alcatel N.V., Amsterdam, Netherlands

[21] Appl. No.: 385,738

[22] Filed: Feb. 8, 1995

Related U.S. Application Data

[63] Continuation of Ser. No. 42,602, Apr. 2, 1993, abandoned.

[30] Foreign Application Priority Data

Apr. 4, 1992 [EP] European Pat. Off. .............. 92105841

[51] Int. Cl.⁶ .................................................. H04M 11/00
[52] U.S. Cl. .............................. 379/100; 379/88; 379/96; 370/61; 358/402
[58] Field of Search ...................... 379/67, 88–100, 379/201, 211, 214, 216, 233; 370/60, 60.1, 61, 62, 85.12, 94.1–94.3, 85.3, 85.5, 124; 358/400, 402, 407, 442

[56] References Cited

U.S. PATENT DOCUMENTS

| | | | |
|---|---|---|---|
| 4,837,798 | 6/1989 | Cohen et al. | 379/88 |
| 4,933,967 | 6/1990 | Lo et al. | 379/94 |
| 5,008,926 | 4/1991 | Misholi | 379/100 |
| 5,193,103 | 3/1993 | Jones et al. | 379/100 |
| 5,291,302 | 3/1994 | Gordon et al. | 379/100 |
| 5,301,226 | 4/1994 | Olson et al. | 379/89 |

FOREIGN PATENT DOCUMENTS

| | | |
|---|---|---|
| 0237834 | 9/1987 | European Pat. Off. . |
| 0412799 | 2/1991 | European Pat. Off. . |
| 8810469 | 12/1988 | WIPO . |

OTHER PUBLICATIONS

Patent Abstracts of Japan, vol. 16, No. 193 (P-1349) 11 May 1992 & JP-A14 40 25 964 (NEC Corp.) 29 Jan, 1992 * Zusammenfussung*.

"SEL–Voice Mail System for the Public Telephone Network", Company Brochure Standard Elektrik Lorenz, AG, Stuttgart, with English Translation of Summary.

"Mezza, Voice and Text Integration in the Office", Office & Information Management International, Feb. 1989, pp. 16–17.

*Primary Examiner*—Wing F. Chan
*Attorney, Agent, or Firm*—Ware, Fressola, Van Der Sluys & Adolphson

[57] ABSTRACT

A network comprising a plurality of voice and/or fax mail systems and one or more exchanges, each having one or more of the voice and/or fax mail systems connected thereto via a plurality of associated access lines, wherein each of the voice and/or fax mail systems has an associated network interface such as a Fiber Distributed Data Interface to a message path interconnecting all of the voice and/or fax mail systems. The network increases the total capacity of the voice and/or fax mail system so that subscribers can leave and retrieve messages in real time, even during busy times of the day.

18 Claims, 2 Drawing Sheets

NETWORK OF VOICE AND/OR FAX MAIL SYSTEMS

This is a continuation of application(s) Ser. No. 08/042,602 filed on Apr. 2, 1993, now abandoned.

TECHNICAL FIELD

The present invention relates to voice mail and/or fax mail systems.

BACKGROUND OF THE INVENTION

A voice mail system accepts voice messages from many subscribers, stores the messages, permits further processing and is able to repeat the messages verbatim.

Each subscriber wishing to use such a voice mail system has a voice box with an associated box number installed. In this way, any subscriber entering this box number can leave a voice message, which the owner of the box can retrieve at any time, process it further (e.g. append a comment) and pass it on. Access is only possible by means of a password (e.g. entering a multiple digit number) known to the box owner, so that only an authorized box owner is able to access his voice box to retrieve and possibly change the voice messages.

Any telephone subscriber can access such a voice mail system via the telephone network by means of an access number assigned to the system, and leave messages for voice box owners, whereby voice output guides the user ("SEL-voice mail system for the public telephone network", company brochure from Standard Elektrik Lorenz AG, Stuttgart).

Furthermore, voice mail systems are known, which can also process text messages, as well as voice and text combinations ("MEZZA, Voice and Text Integration in the Office", Office & Information Management International, February 1989, pages 16 to 17).

Since, on the one hand, any number of subscribers have access to such voice mail systems, but on the other, each voice mail system only has a finite number of access lines (e.g. 64), it can often happen that access for leaving a message or for retrieving it, is not available.

Although the number of access lines in a system could be increased, it would slow the system down significantly because of the greater flood of information. This would entail higher costs for the subscribers due to the longer line utilization time, and finally cause a reduction of the total capacity.

The invention has the task of producing a system that makes a significantly higher traffic load possible, so that subscribers are able to leave a message for a box owner, or a box owner can retrieve his messages, during a particularly critical time of the day.

In addition, a method must be provided for leaving messages in a message box in such a system, and a method for retrieving or leaving messages by a message box owner in such a system.

SUMMARY OF THE INVENTION

According to the invention, these tasks are fulfilled by a network comprising a plurality of voice and/or fax mail systems and one or more exchanges each having one or more of the voice and/or fax mail systems connected thereto via a plurality of associated access lines, each of the voice and/or fax mail systems having an associated network interface (such as FDDI=Fiber Distributed Data Interface) to a message path interconnecting all of the voice and/or fax mail systems.

The invention is also fulfilled by a method of depositing voice and/or fax messages in a subscriber's home mailbox in a network consisting of a plurality of voice and/or fax mail systems, including the steps of transmitting an access number entered by a subscriber to the exchange and seizing an arbitrary idle access line to one of the plurality of voice and/or fax mail systems; outputting from the one voice and/or fax mail system a prompt requesting the subscriber to enter a desired home-mailbox number, and making available a visitor mailbox; after reception of the desired home-mailbox number, transmitting a broadcast message from the one voice and/or fax mail systems via the network interface and the message path to all of the other voice and/or fax mail systems to determine a further system in which the home mailbox associated with the home-mailbox number is installed; transmitting a reply message from the further system via the network interface and the message path to the one system having transmitted the broadcast message, the reply message containing all control data identifying the home mailbox; outputting from the one system a prompt requesting the subscriber to enter a voice message and/or fax message; depositing the entered voice message and/or fax message in the visitor mailbox, and after completion of the entry by the subscriber, transferring the voice message and/or fax message into the bulk storage unit of the one system and transmitting the control data associated with the message via the network interface and the message path to the home mailbox in the further system.

The invention is still further fulfilled by a method of retrieving or depositing voice and/or fax messages from or in a home mailbox of an authorized subscriber in a network consisting of a plurality of voice and/or fax mail systems, including the steps of transmitting an access number entered by the subscriber to the exchange and seizing an arbitrary idle access line to one of the plurality of voice and/or fax mail systems; outputting from the one voice and/or fax mail system a prompt requesting the subscriber to enter a desired home-mailbox number, and making available a visitor mailbox; after reception of a home-mailbox number provided with a code identifying a home-mailbox owner, transmitting a broadcast message from the one voice and/or fax mail system via the network interface and the message path to all of the other voice and/or fax mail systems to determine a further system in which the home mailbox associated with the home-mailbox number is installed; transmitting a reply message from the further system via the network interface and the message path to the one system having transmitted the broadcast message, the reply message containing all control data identifying the home mailbox, including an associated personal access code and a directory; outputting from the one system a prompt requesting the subscriber to enter his or her personal access code, and subsequently checking the entered access code for agreement with the transmitted access code; if the subscriber is an authorized subscriber, outputting a prompt requesting an arbitrary access for retrieval or deposition of a voice message and/or fax message, and making available a permanent connection, for the whole duration of the access, between the one system and the further system comprising the home mailbox via the network interface and the message path, and after completion of the access by the authorized subscriber, transmitting all changed control data via the network interface and the message path to the home mailbox of the further system, and releasing the permanent connection.

On the basis of the network according to the invention, a subscriber can leave messages for a box owner at any time, or a box owner can retrieve or leave messages in his box, without being physically in direct contact with the voice and/or fax mail system, in which his message box is actually installed. In addition, messages for a box owner may even be arbitrarily distributed in the number of voice and/or fax mail systems, because of the connection, according to the invention, of the individual systems by its own high-speed message path, which provides the subscribers with access to all individual systems. From the subscriber's point of view, it is significant in this instance that the entire network behaves as if it was a single voice and/or fax mail system.

BRIEF DESCRIPTION OF THE DRAWINGS

The following explains the principles of the invention by means of a configuration example in conjunction with the figures, where.

BEST MODE FOR CARRYING OUT THE INVENTION

Figure 1:
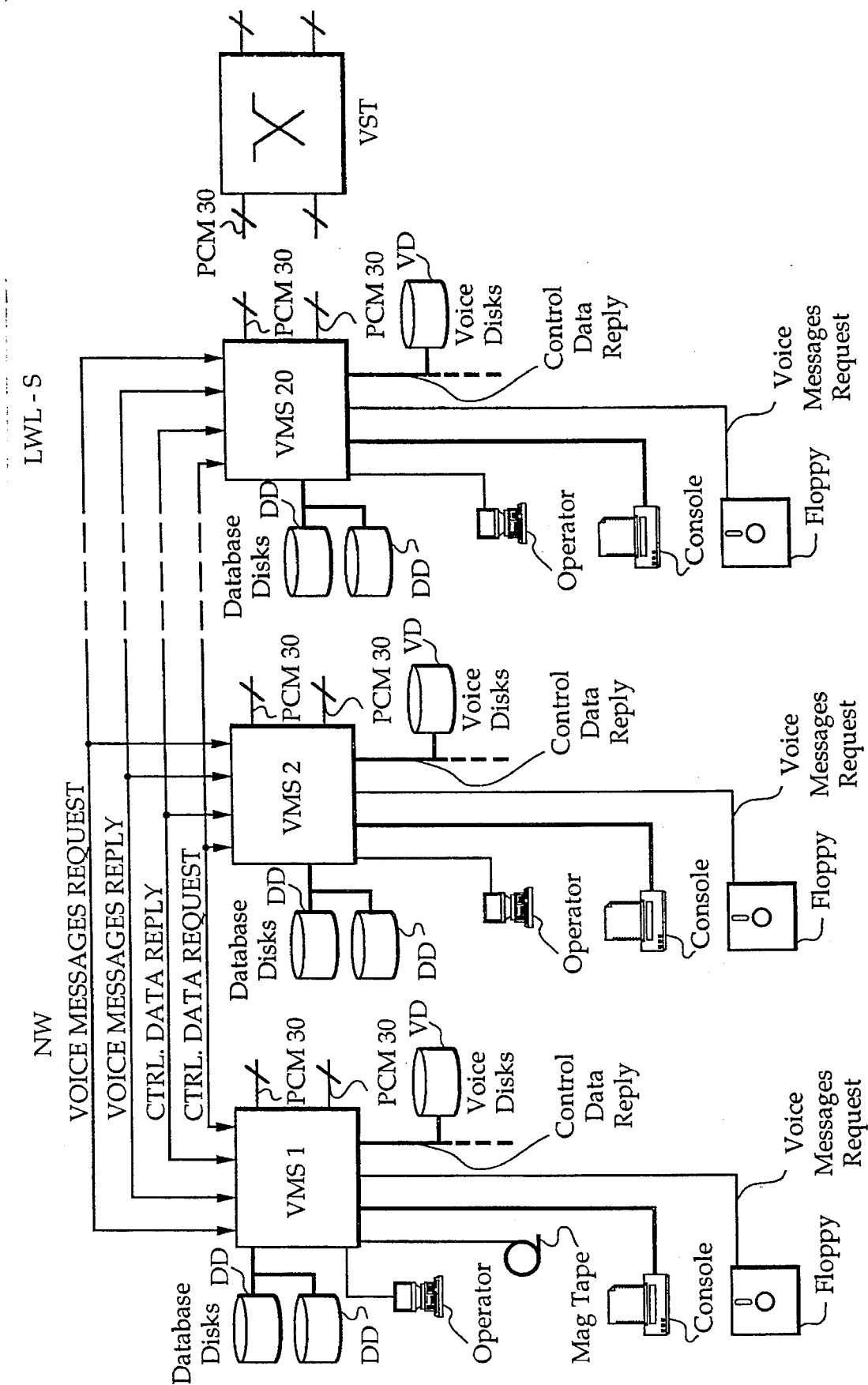
FIG. 1 is a basic circuit diagram if a network according to the invention.

As shown in FIG. 1, a network consists of a number of voice and/or fax mail systems VMS1, . . . , VMS20. Each voice and/or fax mail system VMS1, . . . , VMS20, hereinafter simply called "system", is connected to a standard VST exchange through a number of access lines (e.g. 2×PCM 30 bundles each). Several VST exchanges may be located in one such network, in which case one or more of the voice and/or fax mail systems are connected with one or more exchanges, so that even longer distances (e.g. several 100 km) do not matter. Furthermore, each system contains a number of bulk storage units VD, DD for leaving voice and/or fax mail messages, and for other control data, such as system programs, user and configuration data, as well as indexes of the voice and/or fax mail (voice disks, magnetic tape, database disks, floppy). In addition, each system is equipped with a data display unit and a printer for operation and maintenance (by the operator).

In accordance with the invention, each VMS1, . . . , VMS20 system contains a network interface FDDI, which is connected to a message path NW that joins all the systems. The message path NW is schematically shown in FIG. 1, and is organized in such a way, that significant individual paths can be recognized, as will be explained later on.

Such a message path NW is realized, for example, by a fiber optics ring system FDDI network, where the network interfaces are so-called FDDI (Fiber Distributed Data Interface), which make it possible to convert bidirectional electrical signals into optical signals, for transmission through the fiber optics ring.

Such a fiber optics ring system LWL-S makes a very fast exchange of messages possible, e.g. at 100 MBit/s. Such a fiber optics ring system is realized, for example, with the Fiber Optic Node Controller V/FDDI 4211 Peregrine from Interphase Corporation, 13800 Senlac, Dallas Tex. 75234. This fiber optics ring system is provided for the exchange of messages with systems that contain a VME bus.

Figure 2:
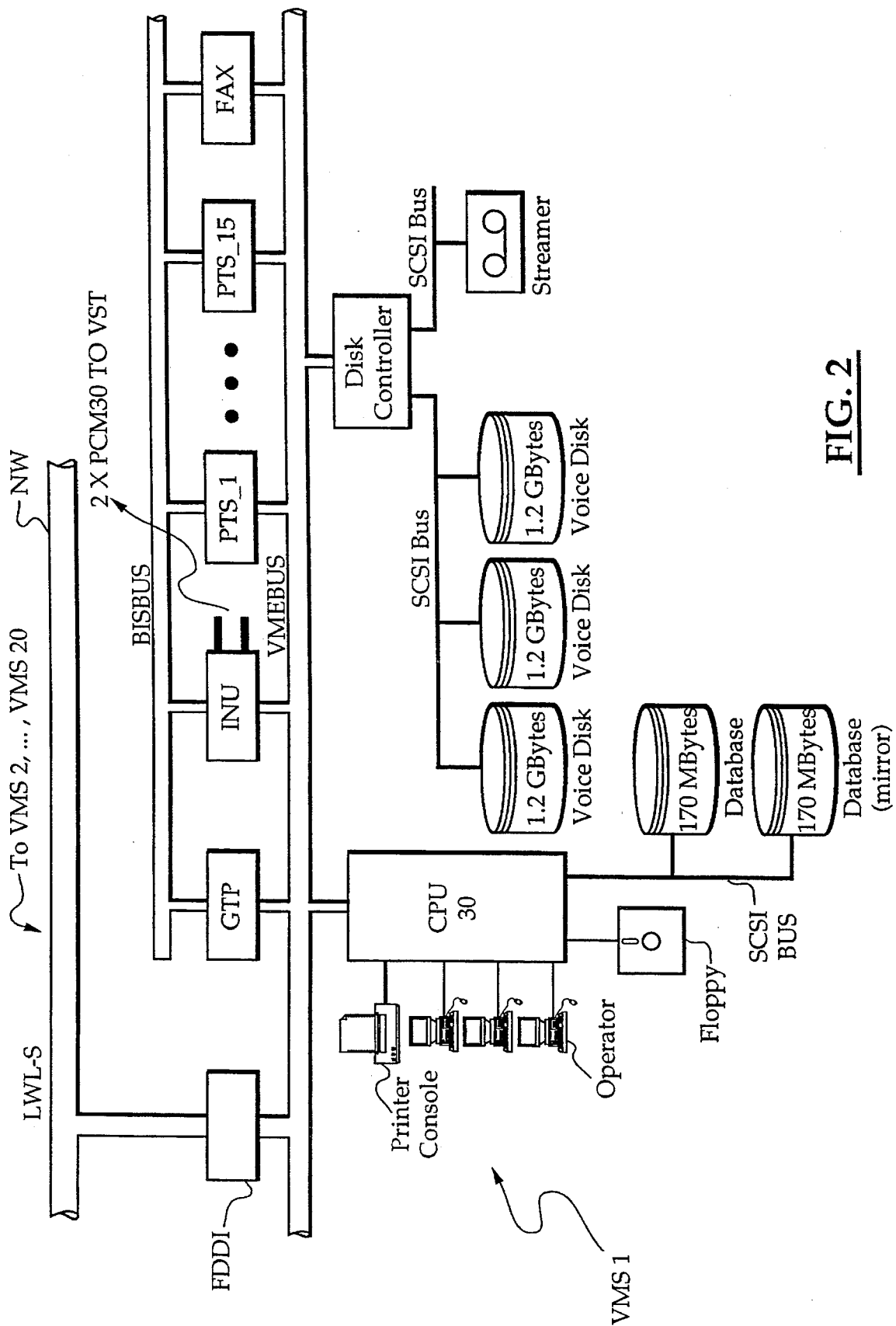
FIG. 2 is a block circuit diagram of a voice and/or fax mail systems according to the invention.

As shown in FIG. 2, in every voice and/or fax mail system VMS1, . . . , VMS20, the above named fiber optics ring system LWL-S is connected to a bus system, namely the VME bus, through the FDDI interface. Furthermore, a signalling unit INU is connected to the access lines PCM30. In addition, the INU signalling unit and a number (15 in this instance) of buffers PTS1, . . . , PTS15, FAX are connected to the VME bus. A switching unit GTP and a control unit CPU-30 for the system are also connected to the VME bus.

Each VMS1, . . . , VMS20 system can be connected to up to 60 access lines, i.e. 60 channels (2×PCM 30), so that each buffer PTS1, . . . , PTS15 services four access lines (channels), as shown in FIG. 2. A corresponding number of INU signalling units must be provided for servicing 60 channels. In addition, as shown in FIG. 2, the bus system of each voice and/or fax mail system has a PCM bus BIS BUS for the exchange of messages (voice dam, fax), which is connected with all the buffers of the INU signalling unit and of the GTP switching unit.

The CPU 30 control unit of each system comprises at least one central computer, one DMA unit, serial and parallel interfaces for connection of the data display unit for operation and maintenance, and to connect the bulk storage units (database disks). The CPU 30 control unit manages the entire system with the respective indexes, and controls the bus system. The GTP switching unit routes all connections through the bus system to the buffers PTS1, . . . , FAX. The INU signalling unit contains a number of so-called line processors, it processes all signals in the access lines and converts them to tasks for the CPU 30 control unit Each of the buffers PTS1, . . . , PTS15 contains a so-called telephone signal processor, which essentially changes the language (digitalized, coded) and preprocesses it, e.g. to suppress speech pauses or possibly make a fax protocol available. The bulk storage units, e.g. hard disks for storing the voice messages, are also connected to the bus system via another bus—SCSI bus—and a disk controller (as shown in FIG. 2).

The following describes the process of the invention for storing voice and/or fax messages in the invention network described earlier (FIGS. 1, 2).

The first case describes where any subscriber, who does not own a so-called home mailbox in the network consisting of a number of systems VMS1, . . . , VMS20, wishes to leave a message (voice and/or fax) for the owner of a home mailbox.

The subscriber first enters a predetermined access number for the voice and/or fax mail system service, which is transmitted to the corresponding exchange VST, which then engages any available free access line to one of the number of VMS1, . . . , VMS20 systems. For example, if the subscriber is connected with the first VMS1 system, the first VMS1 system issues a prompt message requesting the input of the desired home mailbox number. In addition, a so-called visitor mailbox is installed in one of the buffers PTS1 for the subscriber of the first VMS1 system.

After the box number entered by the subscriber is received, the first system, according to the invention, now determines if, when and where the corresponding home mailbox is installed. To that effect, the first VMS1 system sends a broadcast message to all other VMS2, . . . , VMS20 systems through the FDDI interface and the LWL-S fiber optics ring system. The system in which the home mailbox is installed, e.g. the second VMS2 system, then transmits a response message to the first VMS1 system, which is controlled by the CPU 30 control unit through the FDDI interface and the LWL-S fiber optics ring system. This response message contains all the control data that characterize the home mailbox. The first VMS1 system now knows that and also where a home mailbox exists for the box number entered by the subscriber. The first VMS1 system then prompts the subscriber to enter a voice and/or fax message. The voice and/or fax message entered by the subscriber is first stored in the assigned visitor mailbox in the first VMS1 system. After the user completes the voice and/or fax input, the message stored in the visitor mailbox is transferred to the bulk storage unit of the first VMS1 system, i.e. for example from a first buffer PTS1 via the bus system and the hard disk storage unit into a voice disk. The corresponding control data, such as addresses, length of the message, etc. are prepared and transmitted to the second VMS2 system containing the corresponding home mailbox, through the FDDI interface and the LWL-S fiber optics ring system, in order to update the control data pertaining to the home mailbox. Although the voice and/or fax messages are distributed throughout the network, all the control data are actually present in the VMS2 system corresponding to the respective home mailbox. The updating of the control data after completion of the input by the user takes place in an advantageous manner, since no real time execution is required.

In this way, any of the systems may be assigned to a subscriber for leaving a message, no matter whether the desired message box is actually installed in that system.

Based on the network according to the invention, the number of individual VMS1, ..., VMS20 systems behave like a single system, from the point of view of a subscriber. The very fast LWL-S fiber optics ring system (transmission speed 100 MBit/s) transmits all necessary messages in real time, while the subscriber is not aware of any interruption in time.

According to another advantageous development of the invention, after completion of the input by the subscriber, the voice and/or fax messages can be transmitted from the visitor mailbox to the home mailbox in the second VMS2 system, through the LWL-S fiber optics ring system.

If an authorized subscriber, i.e. a subscriber for whom a home mailbox was installed in any of the number of network systems, wishes to retrieve voice and/or fax messages from his box or to deposit them in his box for further distribution, he must first enter the predetermined access number for the "voice and/or fax mail system" service, like any other subscriber. This causes the corresponding exchange VST of the invention to engage any free access line in one of the VMS1, ..., VMS20 systems.

When the subscriber has been connected e.g. with the first VMS1 system, the latter issues a prompt message with the request to enter the desired home mailbox number. In addition, a visitor mailbox is opened for the subscriber.

As described earlier, a box number may now be entered, and, according to the invention, the system is now scanned by the LWL-S fiber optics ring system for the corresponding box.

However, according to the invention, a character, for example the special character #, may be added to the input of the home mailbox number, to identify a box owner.

The first VMS1 system then emits a broadcast message through the FDDI interface and the LWL-S fiber optics ring system.

Based on the identification, the other system, e.g. the second VMS2 system in which the corresponding box is installed, transmits a modified response message via the FDDI interface back to the first VMS1 system. In addition to the control dam, this response message also contains the necessary access code for testing the authorization, as well as an index of the box.

The subscriber is then requested to enter the personal access code, to test whether he is authorized to access this box.

In the affirmative case, the authorized subscriber is now free to use his box, i.e. to retrieve voice and/or fax messages, process them or deposit new messages, which are then transmitted to the message boxes of other subscribers.

In order for the authorized subscriber to be able to perform all functions in real time, the invention makes available a permanent connection between the first VMS1 system and the second VMS2 system containing the home mailbox, through the FDDI interfaces and the LWL-S fiber optics ring system. This enables the authorized subscriber to maneuver as if he only operated with a single voice and/or fax mail system.

After completion of the access by the authorized subscriber, the changed, i.e. updated control data are transmitted to the second VMS2 system through the FDDI interface, for updating the home mailbox, and releasing the permanent connection.

If the authorized subscriber has entered a new message, this message is either placed in the bulk storage unit of the first VMS1 system and only the changed control data are transmitted to the home mailbox, or the changed control data and the message are transmitted to the home mailbox.

The interconnection of e.g. 20 systems with 60 channels each through an LWL-S fiber optics ring system with a high transmission rate, in accordance with the invention, makes available to the user a significantly higher traffic output, so that practically no access problems can occur due to occupied access lines. From the user's point of view, the entire network according to the invention behaves like a single fast and flexible voice and/or fax mail system.

Such a network according to the invention is particularly intended for application in mobile communications (e.g. for the D1 network of DBPT), because such a "voice and/or fax mail system" service is only of interest to mobile radio subscribers when it contains no access problems.

According to the invention, at least one of the voice and/or fax mail systems can be connected to a data display unit for administration, operation and maintenance by the operator. A connection can thus be established with each of the voice and/or fax mail systems through the network interface and the message path, so that the administration, operation and maintenance functions of every other system can be performed from each system containing a data display unit.

In another configuration of the network according to the invention, an Ethernet per IEEE 802.3 or a Token Ring per IEEE 802.5 can be used to realize the FDDI network interfaces and the LWL-S message path.

We claim:

1. A method of depositing voice and/or fax messages in a subscriber's home mailbox in a network comprising a plurality of voice and/or fax mail systems (VMS1, ..., VMS20) and one or more exchanges (VST) each having one or more of said voice and/or fax mail systems (VMS1, ..., VMS20) connected thereto via a plurality of associated access lines (PCM30), each of said voice and/or fax mail systems (VMS1, ..., VMS20) having at least one associated bulk storage unit and an associated network interface (FDDI=Fiber Distributed Data Interface) to a message path (NW) interconnecting all of said voice and/or fax mail systems, wherein each of said network interfaces (FDDI) is a fiber distributed data interface, and wherein each of said network interfaces (FDDI) and said message path (NW) are implemented with a fiber distributed data interface ring (LWL-S), the method comprising the following steps:

transmitting an access number entered by a subscriber to the exchange and seizing an arbitrary idle access line to one (VSM1) of the plurality of voice and/or fax mail systems;

outputting from said one voice and/or fax mail system a prompt requesting the subscriber to enter a desired home-mailbox number, and making available a visitor mailbox;

after reception of the desired home-mailbox number, transmitting a broadcast message from said one voice and/or fax mail systems (VMS1) via the network interface (FDDI) and the message path (NW) to all of the other voice and/or fax mail systems (VMS2), ..., VMS20) to determine a further system (VMS2) in which the home mailbox associated with the home-mailbox number is installed;

transmitting a reply message from the further system (VMS2) via the network interface (FDDI) and the message path (NW) to said one system (VMS1) having transmitted the broadcast message, said reply message containing all control data identifying the home mailbox;

outputting from said one system (VMS1) a prompt requesting the subscriber to enter a voice message and/or fax message;

depositing the entered voice message and/or fax message in the visitor mailbox, and after completion of the entry by the subscriber, transferring the voice message and/or fax message into one of the bulk storage units of said one system (VMS1) and transmitting the control data associated with said message via the network interface (FDDI) and the message path (NW) to the home mailbox in the further system (VMS2).

2. A method as claimed in claim 1, further comprising the following step:

after completion of the entry by the subscriber, transmitting the entered voice message and/or fax message as well as the control data associated therewith via the network interface (FDDI) and the message path (NW) to the home mailbox in the further system (VMS2).

3. A method as claimed in claim 1, wherein at least one of the plurality of voice and/or fax mail systems (VMS1, ..., VMS20) is connected to a visual display unit for administration, operator control, and maintenance, and wherein for the administration, operator control, and maintenance of the plurality of voice and/or fax mail systems, a connection can be established from the visual display unit via the network interface (FDDI) and the message path (NW) to any one of the plurality of voice and/or fax mail systems.

4. A method as claimed in claim 1, wherein each network interface (FDDI) is connected to a bus system of the voice and/or fax mail system, said bus system interconnecting a plurality of buffers (PTS1, ..., FAX), a signalling unit (INU) connected to the access lines (PCM30), a switching unit (GTP), and a control unit (CPU30) in such a way that, on the one hand, both control data transmitted over the access lines (PCM30) and voice and/or fax messages are storable in the bulk storage units (VD, DD) of said one voice and/or fax mail system and, on the other hand, both the control data and the voice and/or fax messages are transmissible via the network interface (FDDI) to any of the other voice and/or fax mail systems.

5. A method as claimed in claim 4, wherein at least one of the plurality of voice and/or fax mail systems (VMS1, ..., VMS20) is connected to a visual display unit for administration, operator control, and maintenance, and wherein for the administration, operator control, and maintenance of the plurality of voice and/or fax mail systems, a connection can be established from the visual display unit via the network interface (FDDI) and the message path (NW) to any one of the plurality of voice and/or fax mail systems.

6. A method of retrieving or depositing voice and/or fax messages from or in a home mailbox of an authorized subscriber in a network consisting of a plurality of voice and/or fax mail systems and one or more exchanges (VST) each having one or more of said voice and/or fax mail systems (VMS1, ..., VMS20) connected thereto via a plurality of associated access lines (PCM30), each of said voice and/or fax mail systems (VMS1, ..., VMS20) having at least one associated bulk storage unit and an associated network interface (FDDI=Fiber Distributed Data Interface) to a message path (NW) interconnecting all of said voice and/or fax mail systems, wherein each of said network interfaces (FDDI) is a fiber distributed data interface, and wherein each of said network interfaces (FDDI) and said message path (NW) are implemented with a fiber distributed data interface ring (LWL-S), the method comprising the following steps:

transmitting an access number entered by the subscriber to the exchange and seizing an arbitrary idle access line to one (VSM1) of the plurality of voice and/or fax mail systems;

outputting from said one voice and/or fax mail system (VMS1) a prompt requesting the subscriber to enter a desired home-mailbox number, and making available a visitor mailbox;

after reception of a home-mailbox number provided with a code identifying home-mailbox owner, transmitting a broadcast message from said one voice and/or fax mail system (VMS1) via the network interface (FDDI) and the message path (NW) to all of the other voice and/or fax mail systems (VMS2, VMS20) to determine a further system (VMS2) in which the home mailbox associated with the home-mailbox number is installed;

transmitting a reply message from the further system (VMS2) via the network interface (FDDI) and the message path (NW) to said one system (VMS1) having transmitted the broadcast message, said reply message containing all control data identifying the home mailbox, including an associated personal access code and a directory;

outputting from said one system a prompt requesting the subscriber to enter his or her personal access code, and subsequently checking the entered access code for agreement with the transmitted access code;

if the subscriber is an authorized subscriber, outputting a prompt requesting an arbitrary access for retrieval or deposition of a voice message and/or fax message, and making available a permanent connection, for the whole duration of the access, between said one system (VMS1) and the further system (VMS2) comprising the home mailbox via the network interface (FDDI) and the message path (NW), and after completion of the access by the authorized subscriber, transmitting all changed control data via the network interface (FDDI) and the message path (NW) to the home mailbox of the further system (VMS2), and releasing the permanent connection.

7. A method as claimed in claim 6, wherein each network interface (FDDI) is connected to a bus system of the voice and/or fax mail system, said bus system interconnecting a plurality of buffers (PTS1, . . . , FAX), a signalling unit (INU) connected to the access lines (PCM30), a switching unit (GTP), and a control unit (CPU30) in such a way that, on the one hand, both control data transmitted over the access lines (PCM30) and voice and/or fax messages are storable in said bulk storage units (VD, DD) of said one voice and/or fax mail system and, on the other hand, both the control data and the voice and/or fax messages are transmissible via the network interface (FDDI) to any of the other voice and/or tax mail systems.

8. A method as claimed in claim 7, wherein at least one of the plurality of voice and/or fax mail systems (VMS1, . . . , VMS20) is connected to a visual display unit for administration, operator control, and maintenance, and wherein for the administration, operator control, and maintenance of the plurality of voice and/or fax mail systems, a connection can be established from the visual display unit via the network interface (FDDI) and the message path (NW) to any one of the plurality of voice and/or fax mail systems.

9. A method as claimed in claim 6, comprising the following step:
if the authorized subscriber has deposited a message in the associated visitor mailbox of said one system, placing the voice message and/or fax message in one of the bulk storage units of said one system and transmitting the control data associated with said message as well as a changed directory via the network interface (FDDI) and the message path (NW) to the home mailbox in the further system (VMS2).

10. A method as claimed in claim 6, comprising the following step:
if the authorized subscriber has deposited a message in the associated visitor mailbox of said one system (VMS1), transmitting the entered voice message and/or fax message via the network interface (FDDI) and the message path (NW) to the home mailbox in the further system (VMS2).

11. A method as claimed in claim 6, wherein at least one of the plurality of voice and/or fax mail systems (VMS1, . . . , VMS20) is connected to a visual display unit for administration, operator control, and maintenance, and wherein for the administration, operator control, and maintenance of the plurality of voice and/or fax mail systems, a connection can be established from the visual display unit via the network interface (FDDI) and the message path (NW) to any one of the plurality of voice and/or fax mail systems.

12. A network comprising of a plurality of voice and/or fax mail systems (VMS1, . . . , VMS20) and one or more exchanges (VST) each having one or more of said voice and/or fax mail systems (VMS1, . . . , VMS20) connected thereto via a plurality of associated access lines (PCM30), each of said voice and/or fax mail systems (VMS1, . . . , VMS20) having at least one bulk storage unit and an associated network interface (FDDI=Fiber Distributed Data Interface) to a message path (NW) interconnecting all of said voice and/or fax mail systems, wherein each of said network interfaces (FDDI) is a fiber distributed data interface, and wherein each of said network interfaces (FDDI) and said message path (NW) are implemented with a fiber distributed data interface ring (LWL-S),
wherein one of said exchanges transmits an access number onto the network in response to said access number being entered by the subscriber to said one exchange, and wherein an arbitrary idle access line to one (VSM1) of the plurality of voice and/or fax mail systems is seized in response to the transmission of said access number onto the network;

wherein, in response to being seized, said one voice and/or fax mail system (VMS1) outputs a prompt, said one exchange being responsive to said prompt for requesting the subscriber to enter a desired home-mailbox number, and wherein said one voice and/or fax mail system is further responsive to being seized for making available a visitor mailbox;

wherein said one voice and/or fax mail system (VSM1) is responsive to the reception of a home-mailbox number for transmitting a broadcast message via the network interface (FDDI) and the message path (NW) to all of the other voice and/or fax mall systems (VMS2, . . . , VMS20) to determine a further system (VMS2) in which the home mailbox associated with the home-mailbox number is installed;

wherein said further system is responsive to said broadcast message for transmitting a reply message via the network interface (FDDI) and the message path (NW) to said one system (VMS1), said reply message containing all control data identifying the home mailbox;

wherein said one system is responsive to said reply message for outputting a second prompt, said one exchange being responsive to said second prompt for requesting the subscriber to enter a voice message and/or fax message;

wherein said one system is responsive to a voice message and/or fax message entered by the subscriber at said one exchange for storing said voice message and/or fax message in said visitor mailbox; and wherein, in response to the completion of the entry of a voice message and/or fax message by the subscriber, said one system transfers the voice message and/or fax message into one of said bulk storage units of said one system (VMS1) and transmits the control data associated with said message via the network interface (FDDI) and the message path (NW) to the home mailbox in the further system (VMS2).

13. A network as claimed in claim 12,
wherein an authorized subscriber is identified by the entry of a code after the entry of a home-mailbox number, said code identifying the subscriber as an authorized subscriber;

wherein said one voice and/or fax mail system (VSM1) is responsive to the reception of said home-mailbox number provided with said code for transmitting an authorized subscriber broadcast message via the network interface (FDDI) and the message path (NW) to all of the other voice and/or fax mail systems (VMS2, . . . , VMS20) to determine a further system (VMS2) in which the home mailbox associated with the home-mailbox number is installed;

wherein said further system is responsive to said authorized subscriber broadcast message for transmitting an authorized subscriber reply message via the network interface (FDDI) and the message path (NW) to said one system (VMS1), said reply message containing all control data identifying the home mailbox, including an associated stored personal access code and a directory;

wherein said one system is responsive to said authorized subscriber reply message for outputting said second prompt, said one exchanges being responsive to said second prompt for requesting the subscriber to enter his or her personal access code, said one system being response to the entry of said personal access code by the authorized subscriber for checking for agreement with the stored personal access code;

wherein, in response to agreement between the entered and the stored personal access code, said one system outputs a third a prompt requesting an arbitrary access for retrieval or deposition of a voice message and/or fax message, said network being responsive to said third prompt for making available a permanent connection, for the whole duration of the access, between said one system (VMS1) and the further system (VMS2) comprising the home mailbox via the network interface (FDDI) and the message path (NW), and wherein, in response to completion of the access by the authorized subscriber, said one system transmits all changed control data via the network interface (FDDI) and the message path (NW) to the home mailbox of the further system (VMS2), and releases the permanent connection.

14. A network as claimed in claim 13, wherein in response to the authorized subscriber depositing a message in the associated visitor mailbox of said one system, the voice message and/or fax message is placed in one of said bulk storage units of said one system, and said one system transmits the control data associated with said message as well as a changed directory via the network interface (FDDI) and the message path (NW) to the home mailbox in the further system (VMS2).

15. A network as claimed in claim 13, wherein in response to the authorized subscriber depositing a message in the associated visitor mailbox of said one system (VMS1), the entered voice message and/or fax message is transmitted from said one system via the network interface (FDDI) and the message path (NW) to the home mailbox in the further system (VMS2).

16. A network as claimed in claim 13, wherein the network interface (FDDI) is connected to a bus system of the voice and/or fax mail system, said bus system interconnecting a plurality of buffers (PTS1, ..., FAX), a signalling unit (INU) connected to the access lines (PCM30), a switching unit (GTP), and a control unit (CPU30) in such a way that, on the one hand, both control data transmitted over the access lines (PCM30) and voice and/or fax messages are storable in bulk storage units (VD, DD) of said one voice and/or fax mail system and, on the other hand, both the control data and the voice and/or fax messages are transmissible via the network interface (FDDI) to any of the other voice and/or fax mail systems.

17. A network as claimed in claim 16, wherein at least one of the plurality of voice and/or fax mail systems (VMS1, . . . , VMS20) is connected to a visual display unit for administration, operator control, and maintenance, and wherein for the administration, operator control, and maintenance of the plurality of voice and/or fax mail systems, a connection can be established from the visual display unit via the network interface (FDDI) and the message path (NW) to any one of the plurality of voice and/or fax mail systems.

18. A network as claimed in claim 13, wherein at least one of the plurality of voice and/or fax mail systems (VMS1, . . . , VMS20) is connected to a visual display unit for administration, operator control, and maintenance, and wherein for the administration, operator control, and maintenance of the plurality of voice and/or fax mail systems, a connection can be established from the visual display unit via the network interface (FDDI) and the message path (NW) to any one of the plurality of voice and/or fax mail systems.

* * * * *

UNITED STATES PATENT AND TRADEMARK OFFICE
CERTIFICATE OF CORRECTION

PATENT NO. : 5,454,030
DATED : September 26, 1995
INVENTOR(S) : Ferraz de Oliveira It is certified that error appears in the above-indentified patent and that said Letters Patent is hereby corrected as shown below:

On the title page, under item [19] "de Oliveira" should read
—Ferraz de Oliveira"—

"Jorge A. Ferraz de Oliveira"

INID [75] "Joao L.R. Costa" should read
"Joao L. Rodriques Costa"

INID [75] "Luis M.F. de Filipe" should read
"Luis M. Faria de Filipe"

INID [56] "5,193,103   3/1993   Jones et al. ........ 379/100"

should read "5,193,110  3/1993 Jones et al. ........ 379/100"

Claim 6, column 8, line 39 "VMS2, VMS20" should read

"(VMS2,...,VMS20)"

Signed and Sealed this

Sixteenth Day of January, 1996

Attest:

BRUCE LEHMAN

*Attesting Officer*    *Commissioner of Patents and Trademarks*